United States Patent [19]

Dorn

[11] Patent Number: 5,283,902
[45] Date of Patent: Feb. 1, 1994

[54] MULTIPROCESSOR SYSTEM HAVING TIME SLICE BUS ARBITRATION FOR CONTROLLING BUS ACCESS BASED ON DETERMINED DELAY TIME AMONG PROCESSORS REQUESTING ACCESS TO COMMON BUS

[75] Inventor: Hermann Dorn, Rathsberg, Fed. Rep. of Germany

[73] Assignee: Siemens Aktiengesellschaft, Munich, Fed. Rep. of Germany

[21] Appl. No.: 759,894

[22] Filed: Sep. 13, 1991

[30] Foreign Application Priority Data

Sep. 20, 1990 [EP] European Pat. Off. ........ 90118137.0

[51] Int. Cl.$^5$ .................. G06F 13/14; G06F 13/36; G06F 13/372; G06F 13/00
[52] U.S. Cl. .................. 395/725; 395/800; 395/325; 395/550; 364/230.5; 364/229.4; 364/242.92; 364/DIG. 1
[58] Field of Search ............... 395/800, 725, 550, 325, 395/650; 340/825.5

[56] References Cited

U.S. PATENT DOCUMENTS

| | | | |
|---|---|---|---|
| 4,257,095 | 3/1981 | Nadir | 395/325 |
| 4,376,975 | 3/1983 | Comfort et al. | 395/725 |
| 4,481,572 | 11/1984 | Ochsner | 395/325 |
| 4,608,631 | 8/1986 | Stiffler et al. | 395/325 |
| 4,684,862 | 8/1987 | Röhrle | 318/568 |
| 4,964,034 | 10/1990 | Jaskowiak | 395/325 |
| 4,972,313 | 11/1990 | Getson, Jr. et al. | 395/325 |
| 4,974,148 | 11/1990 | Matteson | 395/325 |
| 5,029,076 | 7/1991 | Stewart et al. | 395/325 |
| 5,034,881 | 7/1991 | Hoashi et al. | 395/325 |
| 5,140,680 | 8/1992 | Best | 395/325 |
| 5,168,568 | 12/1992 | Thayer et al. | 395/725 |
| 5,193,197 | 3/1993 | Thacker | 395/725 |

FOREIGN PATENT DOCUMENTS

| | | |
|---|---|---|
| 0156921 | 10/1985 | European Pat. Off. . |
| 3501968 | 7/1986 | Fed. Rep. of Germany . |
| 3932590 | 4/1991 | Fed. Rep. of Germany . |

OTHER PUBLICATIONS

IBM Technical Disclosure Bulletin, vol. 30, No. 5, Oct. 1987, New York, US, pp. 163–172; *Synchronised Dual 8051 Shared RAM System*.

IBM Technical Disclosure Bulletin, vol. 24, No. 7B, Dec. 1981, New York, US, pp. 3891–3893; A. Blum; *Multiple Clock Transfer System*.

*Primary Examiner*—Thomas C. Lee
*Assistant Examiner*—Alpesh M. Shah
*Attorney, Agent, or Firm*—Kenyon & Kenyon

[57] ABSTRACT

A method and device operate a system that contains several processors with different priority rankings. The overall system starts its operation as an arbitrating system. The conflict time resulting from a simultaneous request is determined, in each case, and a delay of the processing cycle of the subordinate conflicting processor by precisely this waiting time, takes place. With this, the system operates in time slice control, where the arbitration remains active in the background and intervenes, if necessary. The waiting times of the processors are thereby minimized.

3 Claims, 2 Drawing Sheets

MULTIPROCESSOR SYSTEM HAVING TIME SLICE BUS ARBITRATION FOR CONTROLLING BUS ACCESS BASED ON DETERMINED DELAY TIME AMONG PROCESSORS REQUESTING ACCESS TO COMMON BUS

BACKGROUND OF THE INVENTION

The present invention relates generally to methods and apparatus for operating multiprocessor systems, especially numerical control systems, and more specifically, to such a method and apparatus in which the individual processors have access to the bus on a priority basis that is controlled by bus arbiters that control bus coupling elements that interface with the processors, and where the bus requests during each processing cycle occur in blocks.

Multiprocessor systems can be used for the most varied purposes in numerical controls for machine tools and robots. For example, it is possible to use several processors for the position control of the axes to be traveled, such as one processor per axis. The operation of these processors on a common bus system of this type is disclosed in DE-OS 35 01 968.

In numerical control technology, usually all of the processors are coordinated by a common time signal which determines the processing cycle. At the cycling time the processors request the common bus, as needed. This access is arbitrated to avoid bus conflicts. Processors with priority, e.g. master processors, are treated with preference over subordinate processors, e.g. slave processors. Therefore, the slave processors must wait until the processors with priority withdraw their bus requests. During the waiting time, however, a processor cannot perform any other tasks. The processing output of the entire system is therefore reduced by this waiting time.

It is more advantageous if the individual accesses to the bus by the processors, during normal operation, occur according to a "time slice principle," (i.e. time domain multiplexing), because then the waiting times, which reduce operation time, are eliminated.

A time slice principle is disclosed in DE application 39 32 590. In this fixed time slice operation, however, the borders of the time slices have to be selected in such a way that there are absolutely no overlaps of the time slices. Accordingly, the operation of the processors must always occur according to the strict rules of the time slices, so that no conflicts occur, since these cannot be tolerated within this system.

The present invention is directed to the problem of developing a multiprocessor apparatus that uses bus arbiters as bus access controllers that operate according to the time slice principle, which reduces the waiting times extensively, and which does not require strict time slice boundaries.

SUMMARY OF THE INVENTION

The present invention solves this problem by using switching means for measuring the waiting time of the processors, which occurs during arbitration. Furthermore, means to delay any further bus access requests of the waiting processors are provided, wherein the delay time of these delay means is calculated to at least correspond to the previously measured waiting time.

Such an access delay can be easily implemented by using the switching means to delay the processing cycle of the subordinate processors, which must wait for bus access.

BRIEF DESCRIPTION OF THE INVENTION

DETAILED DESCRIPTION

Figure 1:
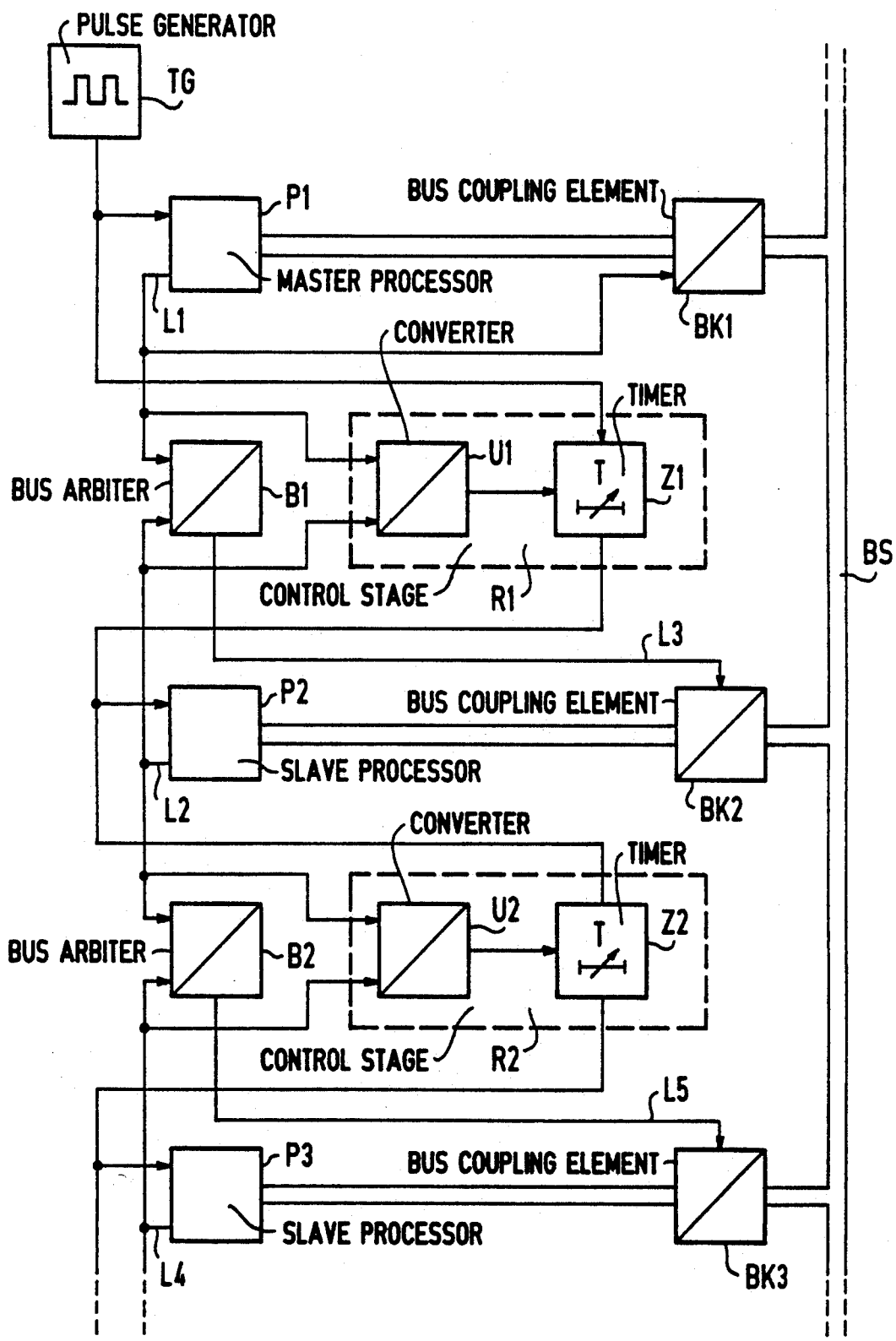
FIG. 1 shows a block diagram of an embodiment of the present invention.

In FIG. 1, three processors P1, P2, and P3 are shown, of which the processor P1 is a master processor, while processors P2 and P3 are first and second subordinate slave processors, respectively.

The three processors P1, P2, P3 are connected with a bus system BS via bus coupling elements BK1, BK2 and BK3. The priority-controlled access takes place using bus arbiters B1 and B2.

If the processor P1 wants to access the bus system BS, it triggers a corresponding bus request signal via a line L1, which is passed directly to the bus coupling element BK1 and activates the latter. The processor P1 thereby has direct access to the bus system BS.

If the subordinate processor P2 would like to access the bus system BS, it gives off a corresponding bus request via a line L2, which leads to the bus arbiter B1, and to the bus arbiter B2. The bus arbiter B1 now checks whether there is a bus request present on the line L1 and outputs a release signal to the bus coupling element BK2 only if a bus request is not present on line L1. If there is a bus request on line L1, the processor P2 simply has to wait until this bus request has been withdrawn.

If the processor P3 wants to access the bus system BS via the bus coupling element BK3, it outputs a bus request via a line L4, which is passed to the bus arbiter B2. The bus arbiter B2 checks whether there is a request from the higher-ranking processor P2 present on the line L2. If there is no such P2 request present on line L2, then the bus arbiter B2 releases the bus coupling element BK3 via a line L5.

The processing cycle of the processors P1, P2 and P3 is controlled by a pulse generator TG, which provides the processor P1 with clock signals directly. The pulse generator also provides the processors P2 and P3 with clock signals, but these, however, are passed via timer elements Z1 and Z2. These elements Z1 and Z2 initially pass the time cycles on without influencing them, during system initiation.

Control stages R1 and R2, indicated with broken lines, are assigned to the bus arbiter B1 and the bus arbiter B2 respectively. They contain the timer element Z1 and Z2, respectively, as well as converters U1 and U2. The converter U1 always registers the time span which exists between the bus request given off by the processor P2 and the withdrawal of the bus request of the processor P1 which might be present. The converter U2 registers the same type of status conditions for the bus request by the processor P3 and the release of the bus by the processor P2. The time span registered in each case can be averaged over several time cycles, if necessary. This results in the converter U1 or the converter U2, respectively, influencing the timer element Z1 and Z2, respectively, in such a way that they delay the signals of the pulse generator TG by the delay time determined in this way. This avoids having the processors P2 and P3 continuously going into waiting positions due to priority bus access. This is illustrated below in the following, using the timing diagram in FIG. 2.

Figure 2:
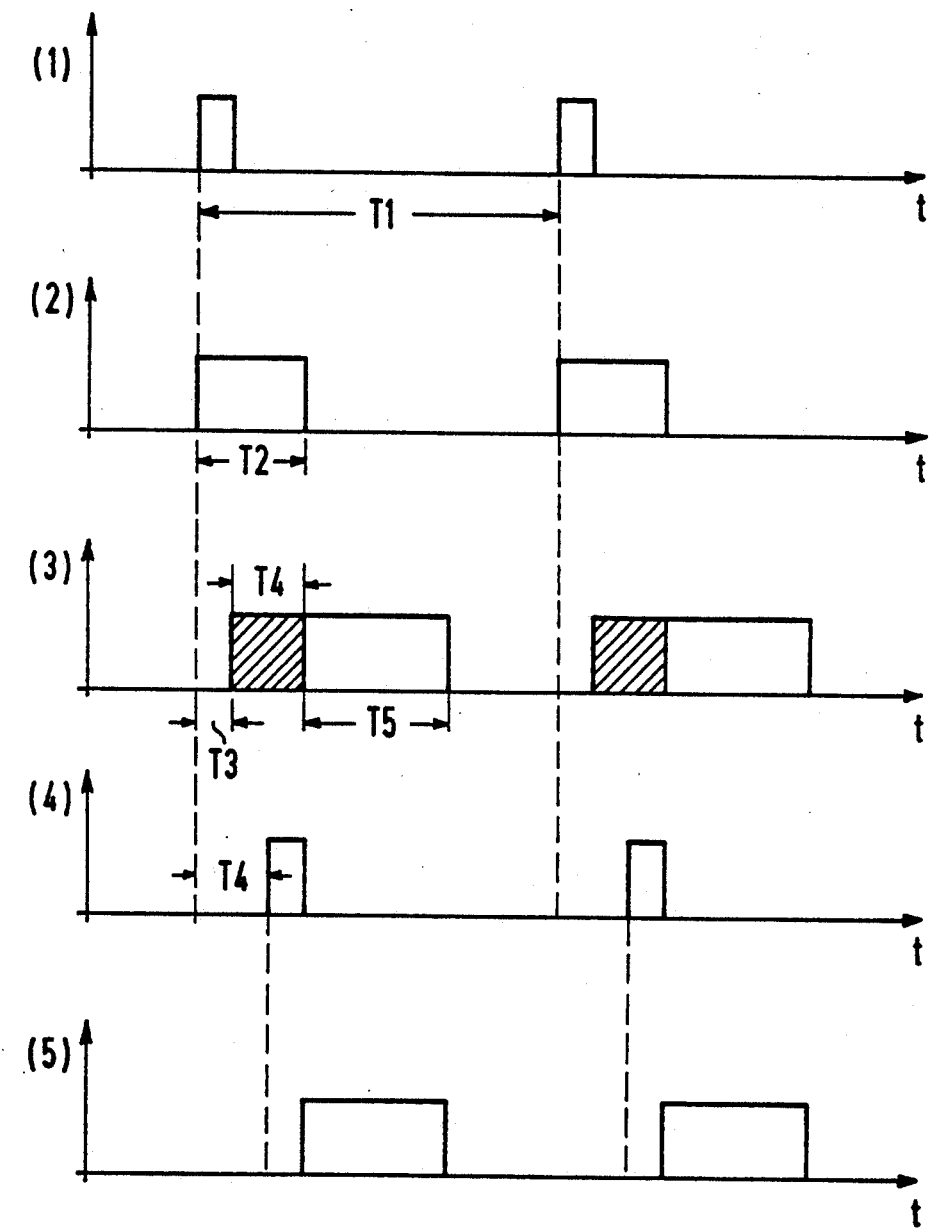
FIG. 2 shows timing diagrams corresponding to the operation of the embodiment of the present invention.

In the timing diagram of FIG. 2, timing of the signal of the pulse generator TG is shown in the diagram (1). At a periodic interval which is determined by a period T1 clock signals are output from the pulse generator, the leading edge (i.e. rising edge) of which are assumed to determine the beginning of the cycle for the system.

In diagram (2) of FIG. 2, it is assumed that with the rising edge of a cycle as in diagram (1), in each case, the processor P1 accesses the bus system BS for one time block, i.e. for a time span T2. The time coincidence is indicated with vertical broken lines.

Diagram (3) of FIG. 2 shows what would happen if the processor P2 wants to achieve its block-type access to the bus system in conflict with the processor P1 without using the present invention. Let it be further assumed that the processor P2 gives off its bus request with a time delay of a time T3 in each case. The bus arbiter B1 then blocks the processor P2 for the duration of a time T4, and only then can the processor P2 have access to the bus system BS, for a time T5, for example. The waiting time is indicated with hatch lines, in each case. If the processor P2 can carry out cyclic processing within a time duration T1, it does have a sufficiently long access time T5 available for access to the bus system, but the processing time is reduced by the waiting time T4. This time represents dead time for the system as a whole.

Diagram (4) of FIG. 2 shows the regulated condition according to the present invention, in which the cycles of the pulse generator TG are delayed using the timer element T1, by the waiting time just determined. Thus, a bus request of the processor P2 can now be activated immediately, without conflict with the processor P1, as shown in Diagram 5.

The overall system thus starts its operation as an arbitrating system, the conflict time in each case is determined, and a delay of the processing cycle of the processor previously recognized as being obligated to wait, adapted to this conflict time, takes place. In this manner, the system operates in the time slice control described initially. Unnecessary waiting times of the processors with lower priority are eliminated. However, the arbitration circuit remains active in the background. If a collision case should occur in regulated operation, after all, it is eliminated with proper priority.

What is claimed is:

1. A bus arbitration device for use in a multiprocessor system having a master processor with a clock input, a bus request line and at least one of an output and an input, a higher-priority slave processor with a clock input, a bus request line and at least one of an output and an input, a lower-priority slave processor with a clock input, a bus request line and at least one of an output and an input, and a common bus, said bus arbitration device comprising:

a) a pulse generator, said pulse generator,
  i) having an output line being connected to said clock input of said master processor, and
  ii) being adapted to generate a periodic signal and to provide said period signal at said output line;

b) a first bus coupling element, said first bus coupling element
  i) having a control input connected to said bus request line of said master processor, and
  ii) being adapted to connect said at least one of said output and said input of said master processor to said common bus when a bus request signal is provided on said bus request line of said master processor;

c) a first bus arbiter, said first bus arbiter
  i) having a first input connected to said bus request line of said master processor and a second input connected to said bus request line of said higher-priority slave processor,
  ii) having a control output, and
  iii) adapted to provide an enable signal on said control output when said higher-priority slave processor is requesting said common bus but said master processor is not requesting said common bus;

d) a second bus coupling element, said second bus coupling element
  i) having an input connected to said control output of said first bus arbiter, and
  ii) being adapted to connect said at least one of said output and said input of said higher-priority slave processor to said common bus when said enable signal of said first bus arbiter is provided on said output of said first bus arbiter;

e) a first converter, said first converter
  i) having a first input connected to said bus request line of said master processor, and a second input connected to said bus request line of said higher-priority slave processor,
  ii) having an output line, and
  iii) being adapted to determine a delay time during which both said master processor and said higher-priority slave processor are requesting said common bus, and to provide said delay time on its output line;

f) a first timer, said timer
  i) having a first input connected to said output line of said pulse generator, and a second input connected to said output line of said first converter,
  ii) having an output line being connected to said clock input of said higher-priority slave processor, and
  iii) being adapted to generate said periodic signal delayed by a time equal to said time delay determined by said first converter, and to provide the generated signal on its output line;

g) a second bus arbiter, said second bus arbiter
  i) having a first input connected to said bus request line of said higher-priority slave processor and a second input connected to said bus request line of said lower-priority slave processor,
  ii) having a control output, and
  iii) adapted to provide an enable signal on its control output a when said lower-priority slave processor is requesting said common bus but the higher-priority slave processor is not requesting said common bus;

h) a third bus coupling element, said third bus coupling element
  i) having an input connected to said control output of said second bus arbiter, and
  ii) being adapted to connect said at least one of said output and said input of said lower-priority slave processor to said common bus when said enable signal of said second bus arbiter is provided on said output of said first bus arbiter;

i) a second converter, said second converter
  i) having a first input connected to said bus request line of said higher-priority slave processor, and a second input connected to said bus request line of said lower-priority slave processor,
ii) having an output line, and
iii) being adapted to determine a second delay time during which both said higher-priority slave processor and said lower-priority slave processor are requesting said common bus, and to provide said second delay time on its output line; and j) a second timer, said second timer
i) having a first input connected to said output line of said first timer, and a second input connected to said second converter,
ii) having an output line being connected to said clock input of said lower-priority slave processor, and
iii) being adapted to generate said periodic signal delayed by a time equal to said second time delay determined by said second converter and said first time delay determined by said first converter, and to provide the generated signal on its output line.

2. In a multiprocessor system having
a master processor having a clock input and a bus request line,
a higher-priority slave processor having a clock input and a bus request line,
a lower-priority slave processor having a clock input and a bus request line, and
a common bus,
a time slice bus arbitration system comprising:
a) a pulse generator, said pulse generator supplying a periodic signal to said clock input of said master processor;
b) a first control stage, said first control stage having
i) a converter, said converter having a first input connected to said bus request line of said master processor and a second input connected to said bus request line of said higher-priority slave processor, and said converter being adapted to generate, at an output, a delay time during which both said master processor and said higher-priority slave processor are requesting said common bus, and
ii) a timer, said timer having a first input connected to said pulse generator and a second input connected to said output of said converter, and being adapted to generate said periodic signal delayed by a time equal to said delay time output by said converter; and c) a second control stage, said second control stage having
i) a converter, said converter having a first input connected to said bus request line of said higher-priority slave processor and a second input connected to said bus request line of said lower-priority slave processor, and said converter being adapted to generate, at an output, a second delay time during which both said higher-priority slave processor and said lower-priority slave processor are requesting said common bus, and
ii) a timer, said timer having a first input connected to said output of said timer of said first control stage and a second input connected to said output of said converter of said second control stage, and being adapted to generate said periodic signal delayed by a timer equal to said second delay time output by said converter of said second control stage and said delay time output by said converter of said first control stage.

3. The time arbitration system of claim 2 wherein said generated delay time is a running average of times during which both said master processor and said higher-priority slave processor request said common bus, and said generated second delay time is a running average of times during which both said higher-priority slave processor and said lower-priority slave processor are requesting said common bus.

* * * * *